United States Patent [19]
Lazzarini

[11] 3,811,000
[45] May 14, 1974

[54] PEELING MACHINE AND METHOD
[75] Inventor: Louis P. Lazzarini, San Jose, Calif.
[73] Assignees: Genevieve I. Hanscom (formerly Genevieve I. Magnuson); Genevieve I. Hanscom; Robert Magnuson; Lois J. Thompson (formerly Lois J. Duggan) Trustees of the estate of Roy M. Magnuson
[22] Filed: Oct. 12, 1971
[21] Appl. No.: 188,240

[52] U.S. Cl. ............. 426/483, 15/3.2, 51/357, 99/586, 99/628
[51] Int. Cl. .... A23n 7/00, A47j 17/18, B24b 29/00
[58] Field of Search .......... 99/233.8, 540, 586, 628; 51/357, DIG. 4; 15/3.17–3.21

[56] References Cited
UNITED STATES PATENTS

| 3,602,282 | 8/1971 | Hirahawa | 99/233.8 X |
| 2,627,140 | 2/1953 | Marzolf | 51/DIG. 4 |
| 3,512,200 | 5/1970 | English | 15/3.17 |
| 2,566,475 | 9/1951 | Wright | 51/DIG. 4 |
| 1,697,601 | 1/1929 | Jones | 15/3.2 |
| 1,976,380 | 10/1934 | Wilkinson | 51/DIG. 4 |
| 2,233,611 | 3/1941 | Hollenbeck | 15/3.17 |
| 2,378,418 | 6/1945 | Lister | 15/3.17 |
| 2,234,766 | 3/1941 | Kennedy | 15/3.2 |

FOREIGN PATENTS OR APPLICATIONS

| 90,260 | 1/1959 | Netherlands | 99/635 |

Primary Examiner—Wayne A. Morse, Jr.
Attorney, Agent, or Firm—Naylor, Neal & Uilkema

[57] ABSTRACT

A peeling machine and method for fruits and vegetables includes a rotatable cylinder having its peripheral wall formed of a plurality of parallel horizontally disposed rotatable peeling rolls through which material such as pears, peaches, etc., is conveyed for peeling action. Each roll is provided with a peeling surface composed of a series of annular resilient peeling elements which are effective on treated fruit and vegetables to remove the skin.

5 Claims, 6 Drawing Figures

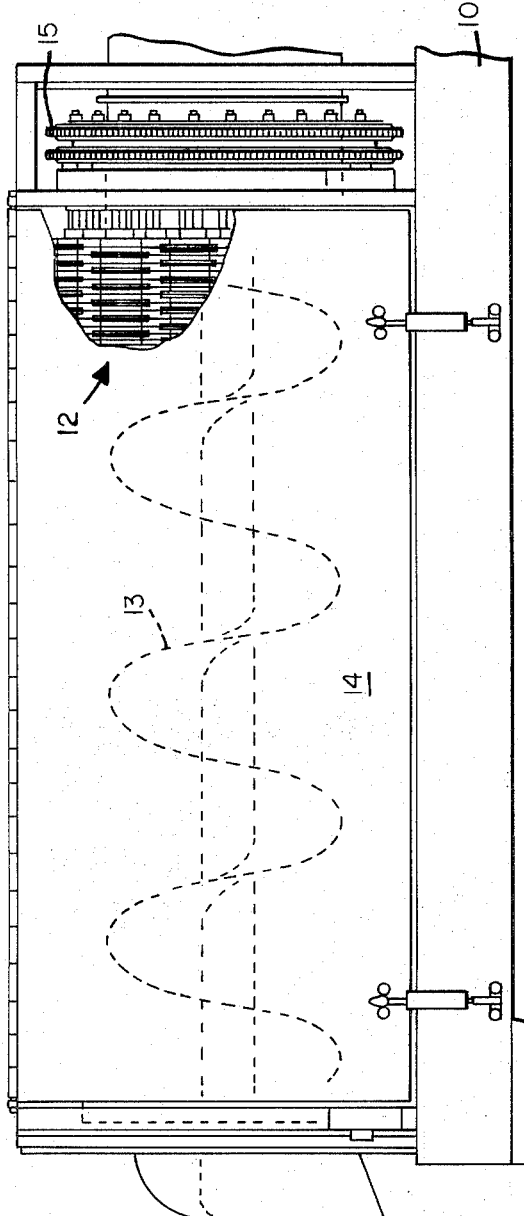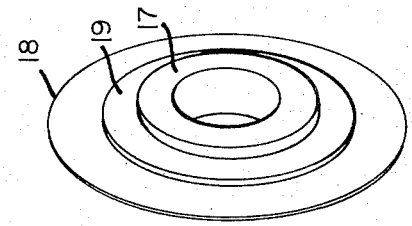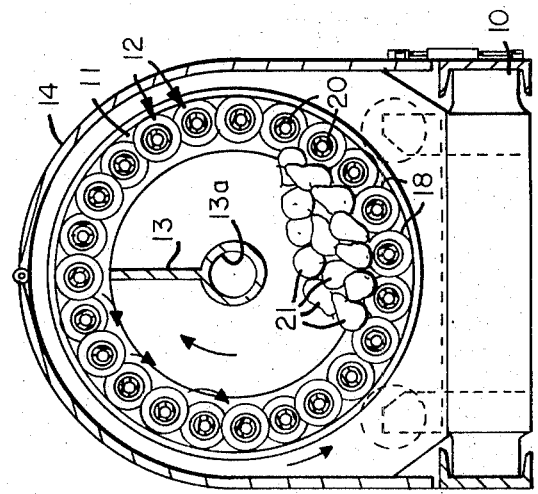
INVENTOR.
LOUIS P. LAZZARINI
BY Allen and Chromy
ATTORNEYS FIG. 3
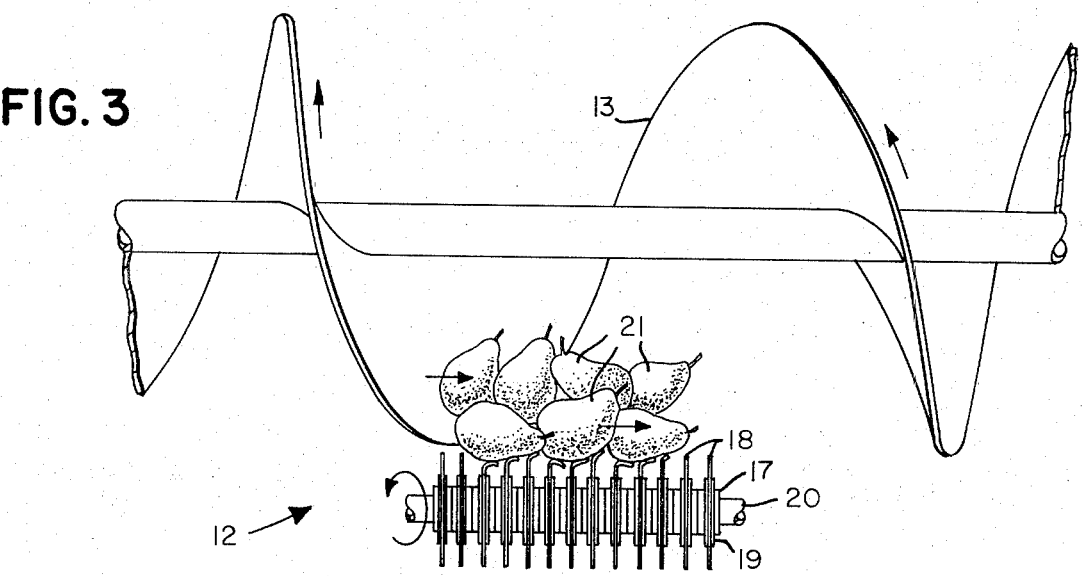
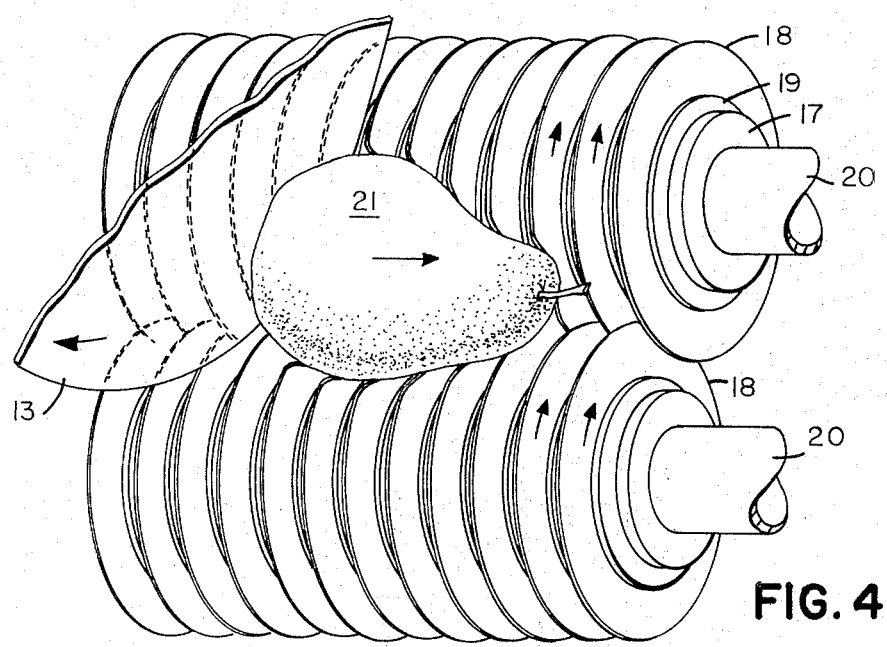
FIG. 4
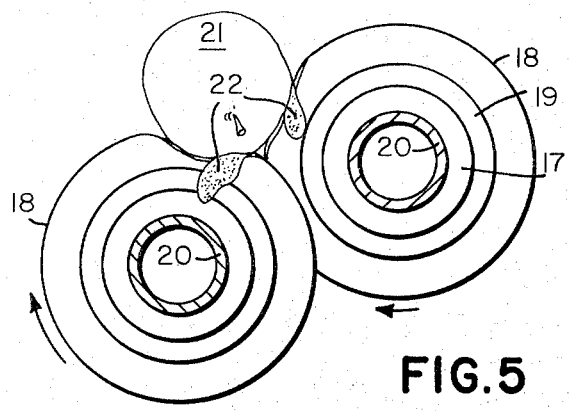
FIG. 5
*INVENTOR.*
LOUIS P. LAZZARINI
BY
Allen and Thomy
ATTORNEYS

PEELING MACHINE AND METHOD

DESCRIPTION OF THE INVENTION

The present invention relates to apparatus and methods for peeling vegetables or fruits by gentle wiping or rubbing methods and is concerned more particularly with the peeling apparatus in which the peeling means is a series of longitudinally extending rolls, each made of annular flexible resilient disks, which preferably are in radial overlapping relation to present transverse bendable peel removing elements to engage the surface of the fruit or vegetable such as, for example, a lye treated pear, and to remove the skin by a gentle wiping or rubbing effect.

This apparatus is of the general character disclosed in the Patent to Dorsa, U.S. Pat. No. 3,134,413 issued May 26, 1964; and in the patent to Daugherty, U.S. Pat. No. 3,437,116 issued Apr. 8, 1969.

It is an object of the present invention to provide a cylindrical vegetable peeler having a peripheral wall made up of a series of peeling rolls wherein each peeling roll embodies an annular series of resilient disks of flexible or bendable character and capable of removing peel by a gentle wiping or rubbing effect.

It is a further object of the invention to provide a peeling method in which a peeling effect is obtained by the feeding of the fruit longitudinally of the drum to be passed therethrough in a tumbling fashion while the relatively rotating movements or effects are applied thereto.

Other objects and advantages of the invention will be apparent from the following description of a preferred embodiment thereof, taken in connection with the accompanying drawings, in which:

FIG. 1 is a fragmentary side elevational view of peeling apparatus of a character embodying the invention;

FIG. 2 is an end elevational view of the peeling apparatus as viewed from the left of FIG. 1;

FIG. 2a is a detailed perspective view of one of the flexible rubber disks employed in conjunction with the peeling elements;

FIG. 3 is a fragmentary operational view showing a group of pears being subjected to the gentle wiping effect of the rotating and of the axially rotating and circumferentially rotating flexible disks;

FIG. 4 is a detail perspective view of a single pear being progressed past two adjacent and overlapping series of disks of two adjacent rolls; and FIG. 5 is a sectional operational view illustrating a single pear having its previously treated skin removed by the gentle wiping effect of two adjacent peeling rolls.

Referring to FIGS. 1 and 2 the peeling apparatus of the instant invention includes a frame 10 upon which a rotary drum or cylinder 11 is mounted for rotation in a conventional manner as shown in the Dorsa et al. U.S. Pat. No. 3,134,413. The cylinder 11 has longitudinally, extending rolls 12 journaled therein to form the periphery of the drum or cylinder. A suitable cover 14 is provided for the apparatus. The drum 11 and the individual peeling rolls 12 are driven individually in a suitable fashion by means described in detail in said U. S. Pat. No. 3,134,413. A screw conveyor 13 is carried by a shaft 13a and serves to progress articles along through the abrasive cylinder formed by the peeling rolls 12 from right to left as viewed in FIG. 1.

Referring to FIG. 2, the peeling cylinder or cage supporting the peeling rolls (looking at the discharge end of the peeling machine) operates in a counterclockwise direction, the screw conveyor 19 rotates in a clockwise direction, and the peeling rolls 12 in the present embodiment also rotate in a clockwise direction. For a further description of this conventional mechanism, reference is hereby made to the above mentioned Dorsa and Daugherty patents.

Referring to FIGS. 2a, 3, 4 and 5, the individual peeling rolls 12 each comprise a shaft 20, a longitudinal series of annular resilient flexible rubber disk elements each including a peeling flange 18. Each disk element is made up of a hub 17 which is in end-to-end abutting relation with an adjacent hub, a supporting annular flange 19 and the projecting peeling flange 18 as seen in FIG. 4, for example. As seen in FIGS. 4 and 5, as the pears are moved past the rotating rollers each of which is rotating both about its own axis and about the axis of the cylinder. The pears are progressed axially of the cylinder by the advancing blade of the spiral conveyor 13 as well as by the lifting action of the rollers themselves in effecting the peeling operation.

In the peeling of pears the skin on the surface of a pear has been treated by the action of lye so that the skin is partially disintegrated and is conditioned for removal, and the action of the rubber disks of one roll alone or in conjunction with an adjacent roll will remove pieces 22 of skin and produce a clean peeling action. Referring, particularly, to FIGS. 3 through 5, in operation, each of the wiping disk flanges 18 is of bendable or flexible character so as to provide a gentle massage action and a surface wiping action by each flange as it bends. These successive surface wiping actions serve to gently rub or wipe the previously loosened pieces of peel from the surface of the pear without excessive removal of meat.

It will be noted referring to FIG. 2, that during the rotation of the drum comprising the cylindrical rubber roll, the pears tend to ride up one wall of the drum or cage and to tumble over each other while in engagement with the rubber flanges of the rolls.

In the peeling of pears, for example, it is satisfactory to rotate the cage in a counterclockwise direction (viewed from the discharge end) at about 14 rpm while the flange rolls are rotating clockwise at from 360 to 641 rpm. The spacing between the adjacent active peeling flanges of the rolls may be approximately five-sixteenths inch and the roll diameter is in the neighborhood of 5½ inches.

It will be understood also that this invention is capable of peeling pears, half peaches, whole peaches, tomatoes, and apples.

While I have shown and described a preferred embodiment of the invention, it will be apparent that the invention is capable of modification and variation from the form shown, so that the scope of the invention should be limited only by the proper scope of the claims appended hereto.

I claim:

1. In a peeler for articles such as vegetables or fruits, a frame, a substantially horizontally disposed cylinder mounted for rotation on said frame and having an inner surface comprising a cylindrical array of longitudinally extending cylindrical rolls, means to feed articles to be peeled into the interior of said cylinder at one end thereof so that said articles are supported on the rolls in the bottom portion of the cylinder, each roll comprising a series of disks having radial flanges, and said flanges being flexible and resilient to bend upon engagement with an article being peeled and to snap back to its radial position upon disengaging from said article and sufficiently flexible to deflect substantially upon support of an article being peeled whereby said article is craddled between adjacent flanges in wiping engagement with the side surfaces thereof, the side surfaces on the flanges of adjacent rolls being capable of simultaneously engaging and wiping an article craddled therebetween, motion imparting means extending longitudinally through said cylinder for engaging articles supported on the rolls and forcibly moving said articles over said rolls in a direction generally normal to the flanges thereof to move said articles through the cylinder and control the duration of time for which articles reside in the cylinder, and means for rotating said rolls individually and as an array.

2. In a peeler as recited in claim 1, in which the flanges of adjacent rolls overlap each other.

3. A method of peeling fruit and vegetable articles which comprises supporting said articles on a bed defined by longitudinally extending rolls having closely adjacent flexible resilient flanges extending radially therefrom of a flexibility sufficient to permit an article supported thereon to resiliently deflect said flanges and be craddled thereby between adjacent flanges whereby the article is in wiping engagement with the side surfaces of adjacent flanges between which it is craddled and may be simultaneously engaged and wiped by the side surfaces of the flanges on adjacent rolls when craddled between said rolls, progressing the articles along a path extending generally normal to said flanges, while imparting a lifting and tumbling effect to the articles, and during said progressing and said lifting and tumbling effect applying a gentle wiping and rubbing effect to the articles by rotation of the rolls and the flanges thereon to effect a peeling operating.

4. A method of peeling fruit and vegetables as recited in claim 3, in which the lifting and tumbling effect is provided by transverse rotary movement of said bed.

5. A method as recited in claim 3, in which said wiping and rubbing effect is applied to an article craddled between adjacent rolls by rotation of the flanges on each of the rolls relative to the article and movement of the article across the flanges on the rolls as the article is progressed along the path extending generally normal to the flanges.

* * * * *